(12) United States Patent
Spies et al.

(10) Patent No.: US 7,107,962 B1
(45) Date of Patent: Sep. 19, 2006

(54) CARBURETOR HAT FOR FORCED INDUCTION SYSTEM

(75) Inventors: Christopher S. Spies, Belton, MO (US); Daniel W. Jones, Lenexa, KS (US)

(73) Assignee: Accessible Technologies, Inc., Lenexa, KS (US)

( * ) Notice: Subject to any disclaimer, the term of this patent is extended or adjusted under 35 U.S.C. 154(b) by 8 days.

(21) Appl. No.: 10/976,120

(22) Filed: Oct. 27, 2004

(51) Int. Cl.
*F02B 77/00* (2006.01)
*F02M 35/10* (2006.01)
*F02M 7/22* (2006.01)

(52) U.S. Cl. ............. 123/198 E; 123/184.21; 123/184.46; 123/184.32; 261/DIG. 19; 261/50.1

(58) Field of Classification Search ........... 123/198 E, 123/184.21, 184.46, 184.32, 198 R, 306, 123/308, 590–593; 261/DIG. 19, 71, 18.23, 261/50.1
See application file for complete search history.

(56) References Cited

U.S. PATENT DOCUMENTS

| | | | | |
|---|---|---|---|---|
| 2,903,847 | A * | 9/1959 | Boyd | 60/605.1 |
| 3,224,174 | A | 12/1965 | Erbstoesser | 55/418 |
| 3,224,746 | A * | 12/1965 | Boyle et al. | 261/71 |
| 3,347,028 | A | 10/1967 | Erbstoesser | 55/210 |
| 3,670,480 | A | 6/1972 | Peterson | 55/457 |
| 3,952,776 | A * | 4/1976 | Eversole et al. | 138/39 |
| 4,168,694 | A * | 9/1979 | Nett | 123/198 R |
| 4,231,383 | A * | 11/1980 | Eversole et al. | 261/50.1 |
| 4,690,107 | A * | 9/1987 | Emler et al. | 123/65 V |
| 4,805,573 | A * | 2/1989 | Macfarlane et al. | 123/184.42 |
| 5,549,085 | A | 8/1996 | Endrigo | 123/184.21 |
| 5,868,808 | A | 2/1999 | Henderson | 123/198 E |
| 6,371,068 | B1 | 4/2002 | Taylor | 123/184.21 |
| 6,478,016 | B1 | 11/2002 | Roderique | 123/559.1 |
| 6,478,469 | B1 | 11/2002 | Jones | 123/559.1 |
| 6,886,526 | B1 * | 5/2005 | Bishop | 123/198 E |
| 2004/0109760 | A1 | 6/2004 | Jones | |

OTHER PUBLICATIONS

Printout for 79 Chevy Malibu 400ci from www.superiorairflow.com website.*
Printout for Extreme Velocity 4150 Series from www.superiorairflow.com website.*

* cited by examiner

*Primary Examiner*—Thai-Ba Trieu
(74) *Attorney, Agent, or Firm*—Hovey Williams LLP (57) ABSTRACT

A forced air induction system (10) constructed in accordance with the principles of a preferred embodiment of the present invention and configured for supplying compressed induction fluid to an internal combustion engine (E) for powering a vehicle (V) is disclosed. The illustrated forced air induction system (10) broadly includes a blower (12) for compressing induction fluid for the engine (E) and an improved carburetor hat (14) in communication with the blower (12) for delivering the compressed induction fluid to the carburetor (C). The illustrated blower (12) is a centrifugal supercharger. The illustrated carburetor hat (14) defines a neck section (26), a throat section (28), and an internal chamber (30) disposed between the neck and throat sections (26,28). The improved carburetor hat (14) is configured to prevent, or at least greatly reduce, the occurrence of thrust and stack up of induction fluid within the chamber (30) and in this regard includes an air-diffuser vane (36) disposed within the chamber (30) so that induction fluid flowing from the inlet (32) must travel around the vane (36) to reach the outlet (34).

26 Claims, 4 Drawing Sheets

CARBURETOR HAT FOR FORCED INDUCTION SYSTEM

BACKGROUND OF THE INVENTION

1. Field of the Invention

The present invention relates generally to equipment for inducing air into an engine, such as an internal combustion engine used to power a vehicle. More specifically, the present invention concerns a carburetor hat for a forced air induction system.

2. Discussion of Prior Art

Internal combustion engines are known in the art, such as engines used to power vehicles of various types. It is also known in the art to utilize a carburetor to mix fuel and induction fluid and deliver this mixture to the combustion chamber(s) of the engine. Prior art carburetors include one or more chambers, or "barrels," that utilize pressure conditions therein to draw predetermined amounts of fuel and induction fluid—i.e., amounts corresponding to the variable throttle settings within the carburetor—into the barrel for mixture and delivery to the corresponding combustion chamber. Each carburetor barrel includes a venturi and a "flow bowl." Pressure conditions within the combustion chamber cooperate with pressure conditions at the intake to the carburetor to introduce induction fluid into the flow bowl. The venturi is typically positioned between the bowl and the combustion chamber and cooperates with the pressure conditions to induce a metered amount of fuel into the venturi where it mixes with the induction fluid from the flow bowl as it is delivered to the combustion chamber. Operation of the carburetor is typically optimized when the pressure at the flow bowl and the pressure within the corresponding venturi are generally balanced. As these pressure conditions become unbalanced, the carburetor will not draw the proper mixture of fuel and induction fluid and thus will not deliver the proper mixture to the combustion chamber(s). Without the proper mixture, the engine will undesirably run too "lean" or too "rich."

It is known in the art to utilize a carburetor hat to deliver induction fluid to the intake of a carburetor. These prior art carburetor hats typically include an air filter housed therein to clean the induction fluid prior to introducing the fluid into the carburetor. These prior art carburetor hats typically draw induction fluid into the hat in a generally horizontal flow and then deliver the fluid to the carburetor in a generally vertical flow. The carburetor is typically positioned beneath the hat and therefore the vertical flow is an "inline" flow into the carburetor's barrel(s). These prior art carburetor hats are problematic and subject to several undesirable limitations. For example, in the prior art carburetor hats, the induction fluid is typically "thrust" against the back wall of the hat prior to inline delivery into the carburetor's barrel(s). Additionally, the induction fluid is prone to "stack up" within the prior art carburetor hats. This back wall thrust and stack up phenomena are undesirable because they each disrupt a desirable consistent and uniform inline flow of induction fluid into the barrel(s). Such disruptions are associated with corresponding and undesirable disruptions in the fuel cycle which result in unoptimized engine output. These phenomena are particularly problematic with multi-barreled carburetors—that is, the front barrels are consistently interrupted. Additionally, these phenomena are particularly limiting in applications where optimized engine output is essential, such as in racing applications.

It is also known in the art to utilize a compressor to compress induction fluid for an internal combustion engine. Relative to normally aspirated induction fluid—i.e., induction fluid drawn into the engine from the atmosphere—the use of a compressor enables a more densified charge of induction fluid to be supplied to the engine, but also accelerates the flow of the induction fluid thereby forcing the fluid to the engine. Therefore, the use of a compressor in combination with a carburetor further exacerbates the problems and limitations of the prior art carburetor hats discussed above. Accordingly, a carburetor hat that does not suffer from these problems and limitations is desired, particularly one that can be used in combination with a compressor.

SUMMARY OF THE INVENTION

The present invention provides an improved carburetor hat that does not suffer from the problems and limitations of the prior art carburetor hats detailed above. The inventive carburetor hat divides the induction fluid flowing through the hat and prevents the fluid from thrusting against the back wall of the hat and stacking up in the hat. The improved hat is particularly well suited for use in combination with a forced air induction system utilizing a compressor. The inventive carburetor hat facilitates inline movement of the fluid and thus enables a more optimum pressure balance with the carburetor.

A first aspect of the present invention concerns a forced air induction system for supplying compressed induction fluid to an internal combustion engine wherein the engine includes a carburetor. The induction system broadly includes a compressor operable to compress inductions fluid for the engine, and a carburetor hat fluidly disposed downstream of the compressor for directing compressed induction fluid into the carburetor. The carburetor hat includes an upstream-most inlet defining a central inlet axis, a downstream-most outlet defining a central outlet axis, and an internal chamber defined between the inlet and outlet. The inlet and outlet axes are non-coaxial. The carburetor hat further includes an air-diffuser vane disposed within the chamber to thereby define a pair of air passageways in the chamber wherein each passageway is spaced from the outlet axis. The air-diffuser is configured to divert the induction fluid flowing through the chamber into at least two separate streams before the induction fluid reaches the outlet axis.

A second aspect of the present invention concerns an improved carburetor hat in a powered vehicle having an internal combustion engine including a carburetor. The improved carburetor hat is for directing induction fluid into the carburetor and broadly includes an outer wall defining a neck section, a throat section, and an internal chamber disposed between the neck and throat sections, and an air-diffuser vane disposed within the chamber. The neck section defines an upstream-most inlet communicating with the chamber. The inlet defines a central inlet axis. The throat section presents an interior circumferential surface and defines a downstream-most outlet communicating with the chamber. The outlet defines a central outlet axis. The inlet and outlet axes are non-coaxial. The internal chamber presents an upper-most ceiling, an oppositely spaced floor, and a pair of sidewalls extending between the ceiling and floor. The air-diffuser vane extends between the ceiling and floor so that induction fluid flowing from the inlet must travel around the vane to reach the outlet. The vane is disposed between the neck and throat sections and presents at least one side extending generally transverse to the inlet axis and being positioned adjacent the interior circumferential surface.

In a preferred embodiment, the carburetor hat includes a pair of air-diffuser vanes spaced around the circumference of the outlet. The upstream-most vane is generally triangular in configuration and extends across the full height of the chamber but is spaced from each of the sides of the chamber. The downstream-most vane is generally arcuate in configuration and extends across the full height of the chamber but is spaced from the back wall of the chamber.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein.

DETAILED DESCRIPTION OF THE PREFERRED EMBODIMENTS

Figure 1:
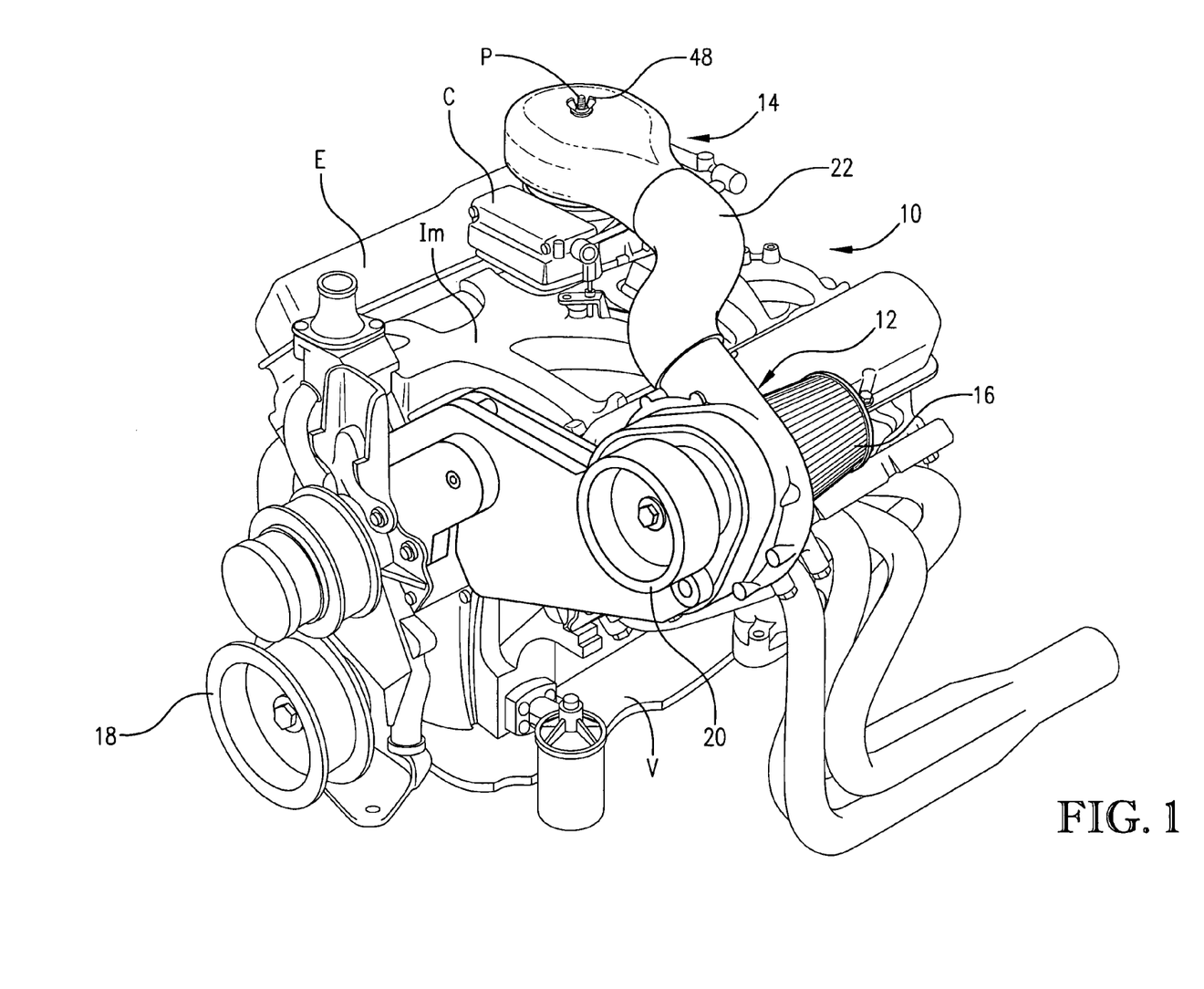
FIG. 1 is a perspective view of a vehicle powered by an internal combustion engine including a forced air induction system having a carburetor hat constructed in accordance with the principles of a preferred embodiment of the present invention.
Figure 2:
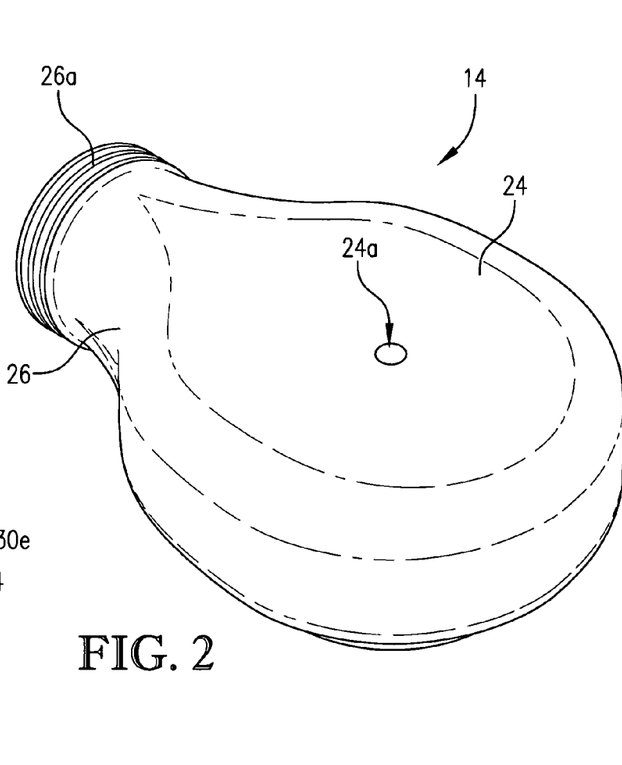
FIG. 2 is a top perspective view of the carburetor hat illustrated in FIG. 1.

FIG. 1 illustrates a forced air induction system 10 constructed in accordance with the principles of a preferred embodiment of the present invention and configured for supplying compressed induction fluid to an internal combustion engine E for powering a vehicle V. The illustrated engine E is an eight cylinder engine that burns gasoline and utilizes a carburetor C that mixes the gasoline with the induction fluid and delivers the mixture through an intake manifold IM to the corresponding cylinders for combustion therein. The illustrated carburetor C is a four-barreled carburetor; however, any suitable carburetor could be utilized. While it is important that the engine utilizes a carburetor, the engine could be otherwise variously configured to suit the selected application. Although the principles of the present invention are particularly well suited for engines used to power land vehicles, the inventive technology could equally be applied to engines used to power other types of vehicles, such as aircraft or marine craft, as well as to non-vehicle applications, such as industrial engines and the like. The illustrated forced air induction system 10 broadly includes a blower 12 for compressing induction fluid for the engine E and an improved carburetor hat 14 in communication with the blower 12 for delivering the compressed induction fluid to the carburetor C.

Turning initially to FIG. 1, the illustrated blower 12 intakes air through a filter 16, compresses the air, and delivers the compressed air to the carburetor hat 14 (although not shown, an intercooler could be utilized). In more detail, the illustrated blower 12 is a centrifugal supercharger including a rotatable impeller housed in a volute case that compresses the air when rotated. In one manner well known in the art, the illustrated blower 12 receives power from the engine's crankshaft. Particularly, a serpentine belt (not shown) entrains a crankshaft pulley 18 fixed to one end of the crankshaft as well as a primary drive pulley 20 to rotatingly communicate power from the crankshaft to the blower 12. In one manner known in the art, the impeller is rotated at significantly higher rpm than the crankshaft, such as with the use of a step-up drive mechanism and/or a step-up transmission within the blower 12. Given the high operational speeds of the impeller and the attendant loads on the internal components of the supercharger 12 coupled with the undesirable impact of catastrophic failure of the supercharger 12, the supercharger 12 preferably includes an impeller shaft supported by a velocity variance-reducing multiple bearing arrangement and a dedicated lubrication system for lubricating the internal components of the supercharger 12. Suitable preferred multiple bearing arrangements are disclosed in applicant's U.S. Pat. Nos. 6,478,469, 6,651,633, and 6,612,747, issued Nov. 12, 2002, Nov. 25, 2003, and Sep. 2, 2003 respectively, each entitled VELOCITY VARIANCE REDUCING MULTIPLE BEARING ARRANGEMENT FOR IMPELLER SHAFT OF CENTRIFUGAL SUPERCHARGER, all of which are hereby incorporated by reference herein. Suitable preferred self-contained dedicated lubrication systems are disclosed in the copending U.S. application Ser. No. 10/641,619 entitled CENTRIFUGAL COMPRESSOR WITH IMPROVED LUBRICATION SYSTEM FOR GEAR-TYPE TRANSMISSION, filed Aug. 14, 2003, having a common assignee with the present application and hereby incorporated by reference herein. It is believed a supercharger having a multiple bearing arrangement and/or a self-contained, dedicated lubrication system reduces the risks of premature failure or in the event of such failure, reduces any attendant undesirable engine damage.

It is believed the supercharger designs disclosed in the above incorporated patents and applications combine to provide a supercharger capable of withstanding the operational loads inherent in powered vehicle applications, whether the vehicle be an automobile, a boat, a motorcycle, or the like. In particular, these supercharger designs provide superior long-lasting, durable superchargers that are unlikely to catastrophically fail and are therefore well suited for vehicle applications. However, it is within the ambit of the present invention to utilize various additional features and/or components for the centrifugal supercharger 12. For example, noise-reducing components and/or features such as a noise-reducing impeller shaft are disclosed in applicant's U.S. Pat. Nos. 6,478,016 and 6,516,788, issued Nov. 12, 2002 and Feb. 11, 2003, respectively, both entitled GEAR DRIVEN SUPERCHARGER HAVING NOISE REDUCING IMPELLER SHAFT, both of which are hereby incorporated by reference herein. Additionally, a soft material insert within the case is disclosed in applicant's copending application for U.S. Ser. No. 10/349,411, filed Jan. 22, 2003, entitled A METHOD AND APPARATUS FOR INCREASING THE ADIABATIC EFFICIENCY OF A CENTRIFUGAL SUPERCHARGER, which claims the priority of provisional U.S. application Ser. No. 60/430,814, filed Dec. 4, 2002 and bearing the same title, both of which are hereby incorporated by reference herein. Furthermore, a multi-phase centrifugal supercharging system could be utilized in place of the single blower 12. A suitable multi-phase system is disclosed in the copending U.S. application Ser. No. 10/710,797 entitled MULTI-PHASE CENTRIFUGAL SUPERCHARGING AIR INDUCTION SYSTEM, filed Aug. 3, 2004, having a common assignee with the present application and hereby incorporated by reference herein.

Although the above-described centrifugal supercharger is preferred, it is within the ambit of the present invention to utilize virtually any type of compressor for pressurizing induction fluid for the engine. For example, the blower 12 could be a positive-displacement blower, such as a Roots-type blower or the like. Additionally, the compressor need not be driven off of the drive train and could be for example, a turbocharger that is driven off of the engine's exhaust. Furthermore, although not preferred, for some aspects of the present invention, the induction system 10 need not utilize a blower, but rather the carburetor hat 14 could receive normally aspirated air from the atmosphere, such as through hosing in communication with an air ram on the front of the vehicle.

As previously indicated, the blower 12 compresses induction fluid and delivers the compressed induction fluid to the carburetor hat 14. Particularly, a supply line 22 is disposed between the blower 12 and the carburetor hat 14 and communicates the outlet of the blower 12 with an inlet (detailed below) for the carburetor hat 14. The improved carburetor hat 14 evenly distributes the compressed induction fluid to the multiple barrels of the carburetor C in a desirable consistent and uniform inline flow thereby minimizing disruptions in the fuel cycle while optimizing engine output.

In more detail, and turning to FIGS. 2–6, the illustrated carburetor hat 14 includes an outer wall 24 that defines a neck section 26, a throat section 28, and an internal chamber 30 disposed between the neck and throat sections 26,28. The outer wall 24 generally defines the overall shape of the carburetor hat 14 and in the illustrated hat 14, the wall 24 generally defines a tear-dropped shape. Although shown in FIGS. 3 and 5 in split sectional views for illustrative purposes, the illustrated outer wall 24 is preferably machined from a single billet or cast construction to present an integral, unitary configuration. The wall 24 is preferably formed from metal, such as aluminum, but could be formed from any suitable material, including various metals and/or plastics. The neck section 26 defines an upstream-most inlet 32 (see FIG. 4) communicating with the chamber 30. All of the induction fluid entering the carburetor hat 14 enters the internal chamber 30 through the inlet 32. The illustrated inlet 32 is generally circular in configuration and defines a horizontally extending central inlet axis (designated as $A_I$ in FIGS. 3–6). The neck section 26 is generally cylindrical in configuration and includes at least a portion that defines external circumferential ribs 26a that facilitate sealing receipt of the supply line 22 (see FIGS. 1 and 2). In this manner, all of the induction fluid compressed by the blower 12 is supplied to the carburetor hat 14 via the inlet 32.

Figures 4, 5:
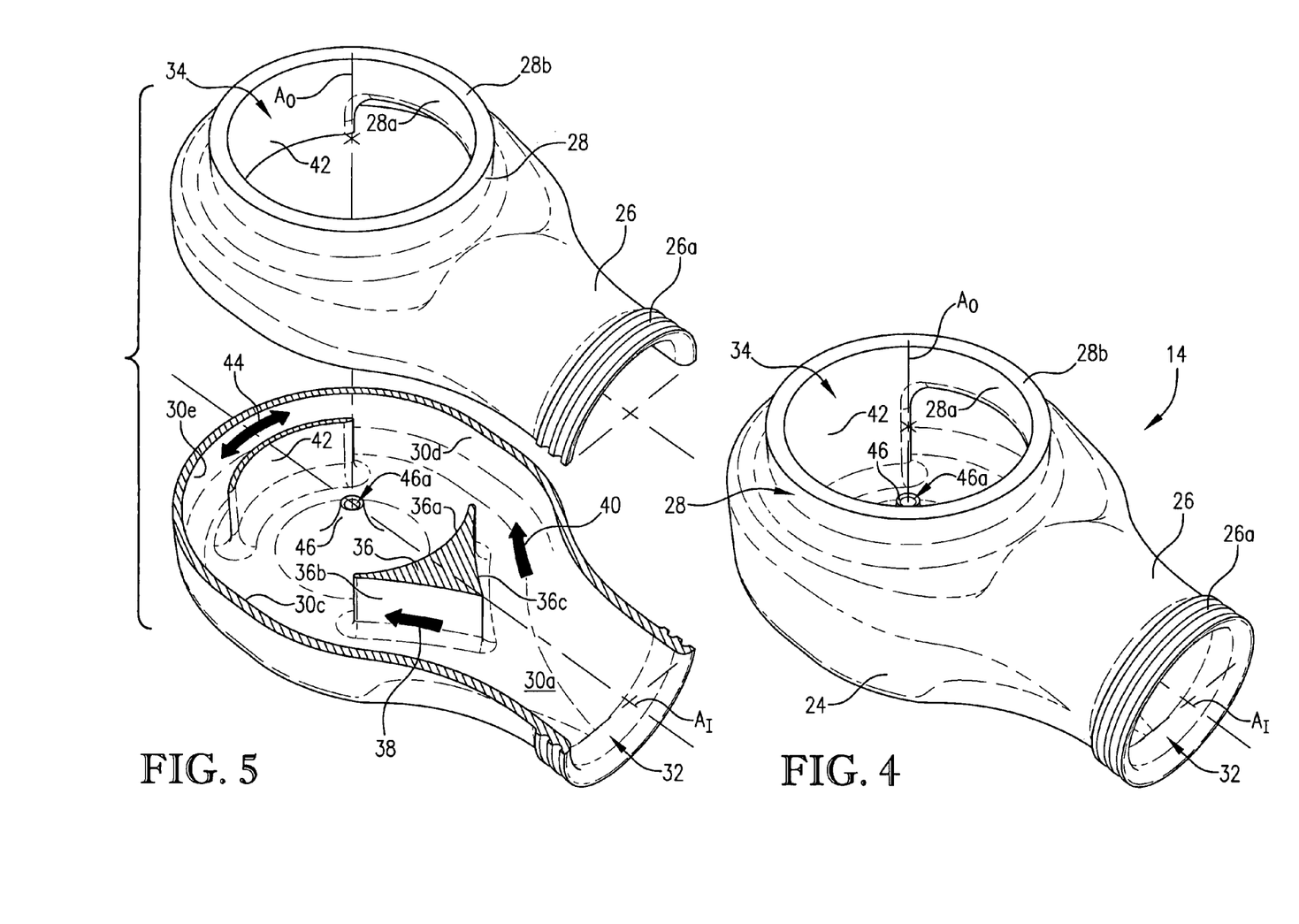
FIG. 4 is a bottom perspective view of the carburetor hat illustrated in FIGS. 1–3.
FIG. 5 is an exploded bottom perspective view of the carburetor hat illustrated in FIGS. 1–4 with the outer wall pulled apart to illustrate the internal chamber and the components housed therein.

As shown in FIGS. 4 and 5, the illustrated throat section 28 is generally cylindrical in configuration and projects downwardly out of the chamber 30. The throat section 28 defines a downstream-most outlet 34 communicating with the chamber 30. All of the induction fluid exiting the carburetor hat 14 exits the internal chamber 30 through the outlet 34. The illustrated outlet 34 is generally circular in configuration and defines a vertically extending central outlet axis (designated as $A_O$ in FIGS. 3–6). The throat section 28 presents a generally cylindrical interior circumferential surface 28a and a generally flat lower-most sealing surface 28b that facilitates sealing the carburetor hat 14 on top of the carburetor C. The carburetor hat 14 is configured to be directly over the barrels of the carburetor C so that induction fluid flowing vertically out of the outlet 34 is flowing in an "inline" direction relative to the barrels of the carburetor C. In the illustrated carburetor hat 14, the inlet and outlet axes $A_I$, $A_O$ are generally perpendicularly extending relative to one another. In this manner, compressed induction fluid entering the inlet 32 must change direction at least about ninety degrees to exit the outlet 34 in an inline direction. The inlet and outlet axes $A_I$, $A_O$ need not be orthogonally aligned; however, given the spacial limitations of most vehicle engine compartments, in most applications, the inlet and outlet axes are non-coaxial and the inlet and outlet will be at least non-coplanar in alignment.

Figure 3:
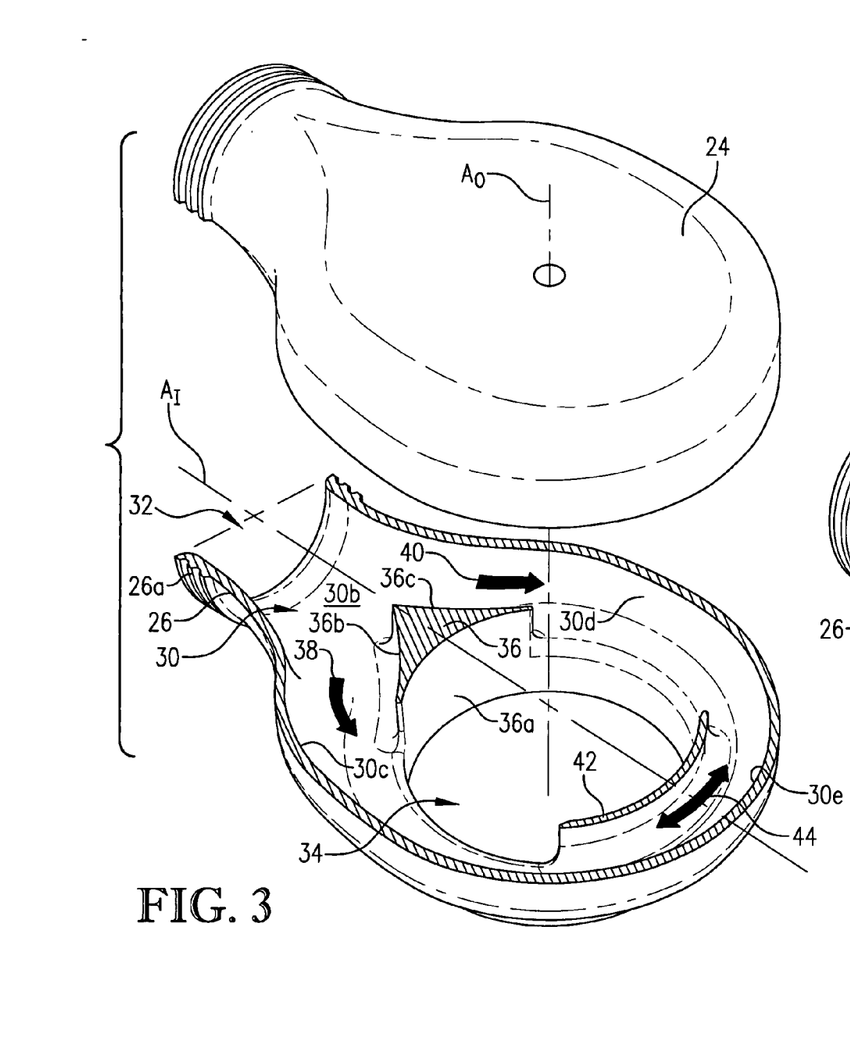
FIG. 3 is an exploded top perspective view of the carburetor hat illustrated in FIGS. 1 and 2 with the outer wall pulled apart to illustrate the internal chamber and the components housed therein.

As shown in FIGS. 3 and 5, the internal chamber 30 is defined between the inlet 32 and the outlet 34 and presents an upper-most ceiling 30a, an oppositely spaced floor 30b, a pair of sidewalls 30c and 30d, and a back wall 30e. The walls 30c–e each extend between the ceiling 30a and the floor 30b. The internal chamber 30 is generally air tight so that all of the compressed induction fluid entering the hat 14 through the inlet 32 flows through the chamber 30 before exiting the hat 14 through the outlet 34. It is preferable to filter the induction fluid prior to it entering the carburetor C. In the illustrated system 10, the filter 16 at the inlet to the blower 12 is sufficient. However, a filter could be included within the chamber 30.

Given the non-coplanar alignment of the inlet and outlet and the non-coaxial arrangement of the inlet and outlet axes inherent in carburetor hats, the induction fluid is typically "thrust" against the back wall of the hat prior to inline delivery into the carburetor's barrel(s). Additionally, the induction fluid is prone to "stack up" within carburetor hats. This back wall thrust and stack up phenomena are undesirable because they each disrupt a desirable consistent and uniform inline flow of induction fluid into the barrel(s). Such disruptions are associated with corresponding and undesirable disruptions in the fuel cycle which result in unoptimized engine output. These phenomena are particularly problematic with multi-barreled carburetors—that is, the front barrels are consistently interrupted. Additionally, these phenomena are particularly limiting in applications where optimized engine output is essential, such as in racing applications. Additionally, the use of a compressor in combination with a carburetor further exacerbates the problems and limitations associated with thrust and stack up.

Figure 6:
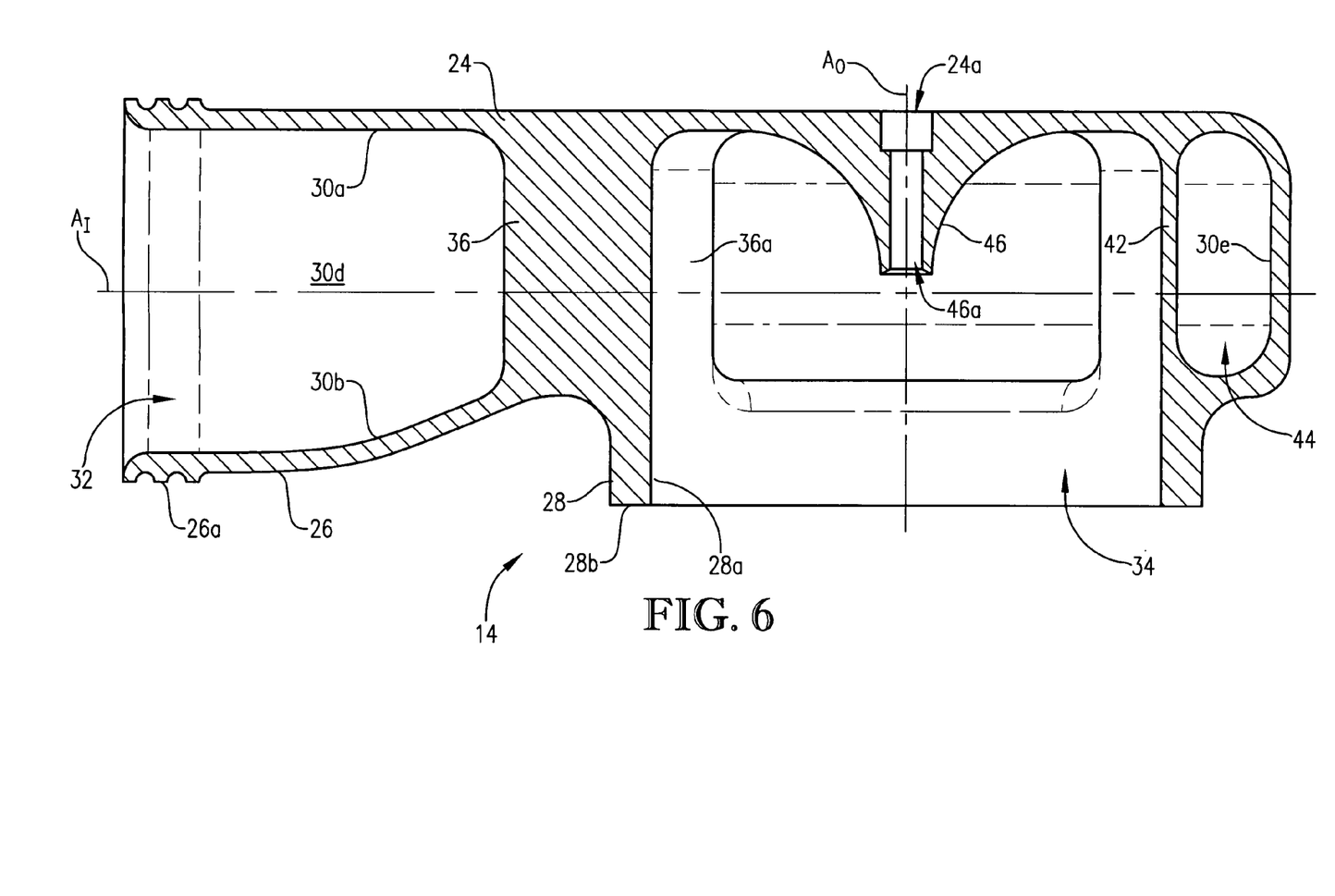
FIG. 6 is an enlarged longitudinal sectional view of the carburetor hat illustrated in FIGS. 1–5.

The improved carburetor hat 14 is configured to prevent, or at least greatly reduce, the occurrence of thrust and stack up of induction fluid within the chamber 30. In more detail, and as shown in FIGS. 3, 5, and 6, the illustrated carburetor hat 14 includes an air-diffuser vane 36 disposed within the chamber 30 and extending between the ceiling 30a and floor 30b so that induction fluid flowing from the inlet 32 must travel around the vane 36 to reach the outlet 34. The air-diffuser vane 36 is disposed between the neck and throat sections 26, 28. The illustrated air-diffuser vane 36 is generally triangular in configuration and defines three sides 36a, 36b, and 36c. The side 36a extends generally transverse to, and projects to either side of, the inlet axis $A_I$. The side 36a is generally arcuate and is positioned adjacent the interior circumferential surface 28a of the throat section 28. The illustrated side 36a is positioned directly above the surface 28a and forms an upwardly projecting extension of the surface 28a. The sides 36b,36c each extend from the side 36a towards the inlet 32 and converge generally at the inlet axis $A_I$. The air-diffuser vane 36 is also spaced from each of the sidewalls 30c,30d. In this manner, the vane 36 defines a pair of arcuate air passageways (designated by arrows 38 and 40 in FIGS. 3 and 5) in the chamber 30 on either side of the vane 36. Each of the illustrated passageways 38,40 is spaced from both the inlet and outlet axes $A_I$, $A_O$ so that induction fluid flowing through the chamber 30 is diverted into at least two separate diverging air streams before the induction fluid reaches the outlet 34.

It is believed that splitting the induction fluid into two divergent streams upstream of the outlet 34 prevents, or greatly reduces, the induction fluid from undesirably thrusting against the back wall 30e of the internal chamber 30 and further prevents the induction fluid from "stacking up" within the chamber 30. As indicated above, these thrust and stack up phenomenon are undesirable problems in the prior art carburetor hats that cause unwanted interruptions in the fuel cycle and drain engine output. Additionally, as detailed above, the problems associated with these phenomenon in induction systems that utilize a multi-barrel carburetor and an upstream blower are even further exacerbated by the attendant increased flow of induction fluid. In this regard, the improved carburetor hat of the present invention with the air-diffuser vane minimizes the thrust and stack up and thus minimizes interruptions in the fuel cycle as well as optimizes engine output. While the illustrated configuration of the air-diffuser vane 36 is preferred, the vane 36 could be variously alternatively configured and need not for example present a triangular shape. However, it is important that the vane be configured to split the induction fluid in some manner upstream of the outlet axis.

The illustrated carburetor hat 14 includes an additional air-diffuser vane 42 disposed within the chamber 30 and spaced from the air-diffuser vane 36. The illustrated air-diffuser vane 42 is disposed between the vane 36 and the back wall 30e of the chamber 30. Particularly, the vane 42 is generally arcuate in configuration and extends upwardly from the interior circumferential surface 28a of the throat section 28. The vane 42 extends generally transverse to, and projects to either side of, the inlet axis $A_I$. In this manner, the vane 42 defines a third air passageway (designated as arrow 44 in FIGS. 3 and 5) within the internal chamber 30. The passageway 44 is defined between the additional vane 42 and the back wall 30e of the chamber 30. The vane 42 extends between the ceiling 30a and floor 30b so that induction fluid flowing through the passageway 44 must travel around the additional vane 42 to reach the outlet 34. It is believed the additional vane 42 further prevents thrust and stack up within the chamber 30. It is within the ambit of the present invention to utilize more than two vanes. However, it is important that the chamber 30 include at least one air-diffuser vane, although more than one vane is not necessary.

Turning to FIGS. 4–6, the illustrated carburetor hat 14 includes a generally frustoconical projection 46 positioned between the vanes 36 and 42. The projection 46 extends downwardly from the ceiling 30a of the internal chamber 30. However, the projection 46 is spaced from the floor 30b of the chamber 30 and the outlet 34. The illustrated projection is centered around the outlet axis $A_O$. In this regard, it is believed the projection 46 facilitates induction fluid flowing from the inlet 32 in a horizontal direction to reorient into the inline, or vertical direction for smooth flow out of the outlet 34 and into the carburetor C. The illustrated projection 46 defines an internal bore 46a extending through the projection 46. The bore 46a is configured to receive a threaded post P (see FIG. 1) of the carburetor C. The bore 46a communicates with an aperture 24a formed through the top of the outer wall 24 to thereby intercommunicate the chamber 30 with the atmosphere. In this manner, well known in the art, the carburetor hat 14 can be removably secured to above the carburetor C, such as with a wing nut 48 (see FIG. 1).

It is within the ambit of the present invention to utilize various alternative configurations for the carburetor hat 14, and any suitable size, shape, and materials could be utilized. However, it is important that the carburetor hat include at least one air-diffuser vane configured to split the induction fluid in some manner upstream of the outlet axis.

In operation, the blower 12 is bracketed to the engine E and drivingly connected thereto with a belt entraining the pulleys 18,20. The filter 16 is coupled adjacent the inlet of the blower 12 and the supply line 22 is coupled to the outlet of the blower 12. The carburetor hat 14 is then positioned above the carburetor C so that the threaded post P extends through the aperture 24a in the top of the outer wall 24 and the wing nut 48 is threaded onto the post P to secure the hat 14 in place. The supply line 22 is then coupled to the hat 14 over the ribs 26a formed in the neck section 26. The forced air induction system 10 is now ready for operation. When the engine E is operating, induction fluid is drawn through the filter 16 into the blower 12 where it is compressed and forced through the supply line 22. The compressed induction fluid enters the chamber 30 through the inlet 32 of the carburetor hat 14. Once the fluid enters the chamber 30, it is split into two air streams at the air-diffuser vane 36 that travel along the respective air passageways 38 and 40. Each split stream of induction fluid is then drawn into a smooth inline flow through the throat section 28, out the outlet 34, and into the barrels of the carburetor C in a continuous and uniform manner. Any induction fluid that is not drawn through the outlet 34 is directed through the passageway 44 and recirculated back to the throat section where it is drawn into a smooth inline flow out of the outlet 34.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

The invention claimed is:

1. A forced air induction system for supplying compressed induction fluid to an internal combustion engine wherein the engine includes a carburetor, said induction system comprising:

a compressor operable to compress inductions fluid for the engine; and a carburetor hat fluidly disposed downstream of the compressor for directing compressed induction fluid into the carburetor, said carburetor hat including an upstream-most inlet defining a central inlet axis, a downstream-most outlet defining a central outlet axis, and an internal chamber defined between the inlet and outlet, said inlet and outlet axes being non-coaxial, said carburetor hat further including an air-diffuser vane disposed within the internal chamber to thereby define a pair of air passageways in the internal chamber wherein each passageway is spaced from the outlet axis, said air-diffuser vane being configured to divert the induction fluid flowing through the internal chamber into at least two separate streams before the induction fluid reaches the outlet axis, said air-diffuser vane being disposed between and spaced from the central inlet axis and the central outlet axis, said air-diffuser vane being generally triangular in configuration and defining at least three sides, a first one of the sides extending generally transverse relative to the inlet axis, the other two sides extending from the first side towards the inlet and converging generally at the inlet axis.

2. A forced air induction system for supplying compressed induction fluid to an internal combustion engine wherein the engine includes a carburetor, said induction system comprising:

a compressor operable to compress inductions fluid for the engine; and a carburetor hat fluidly disposed downstream of the compressor for directing compressed induction fluid into the carburetor, said carburetor hat including an upstream-most inlet defining a central inlet axis, a downstream-most outlet defining a central outlet axis, and an internal chamber defined between the inlet and outlet, said inlet and outlet axes being non-coaxial, said carburetor hat further including an air-diffuser vane disposed within the internal chamber to thereby define a pair of air passageways in the internal chamber wherein each passageway is spaced from the outlet axis, said air-diffuser vane being configured to divert the induction fluid flowing through the internal chamber into at least two separate streams before the induction fluid reaches the outlet axis, said carburetor hat further including an additional air-diffuser vane disposed within the chamber and spaced from the first-mentioned air-diffuser vane.

3. The system as claimed in claim 2,
said inlet and outlet axes being generally perpendicular.

4. The system as claimed in claim 3,
said central inlet axis being a generally horizontally extending axis,
said central outlet axis being a generally vertically extending axis.

5. The system as claimed in claim 2,
said air-diffuser vane being disposed between and spaced from the central inlet axis and the central outlet axis.

6. The system as claimed in claim 5,
said air-diffuser vane being spaced from and disposed between the inlet and the outlet.

7. The system as claimed in claim 2,
said first-mentioned air-diffuser vane being disposed between the inlet and the outlet,
said additional air-diffuser vane being disposed between the outlet and the end of the chamber distal-most relative to the inlet to thereby define a third air passageway between the additional vane and the distal-most end of the chamber.

8. The system as claimed in claim 7,
said first-mentioned air diffuser vane being generally triangular in configuration,
said additional air diffuser vane being generally arcuate in configuration.

9. The system as claimed in claim 8,
said outlet being generally circular in configuration,
said carburetor hat further including a generally cylindrical throat section,
said throat section terminating at the circular outlet.

10. The system as claimed in claim 9,
said first-mentioned air diffuser vane defining at least three sides,
a first one of the sides extending generally transverse relative to the inlet axis,
said first one of the sides and at least a portion of said additional air diffuser vane extending axially from the inside circumferential surface of said throat section.

11. The system as claimed in claim 2,
said carburetor hat further including a generally frusto-conical projection extending downwardly from the upper-most margin of the internal chamber,
said projection being positioned between the vanes.

12. The system as claimed in claim 11,
said projection defining an internal bore extending through the exterior wall of the carburetor hat to thereby intercommunicate the chamber with the atmosphere.

13. The system as claimed in claim 2,
said compressor comprising a centrifugal supercharger.

14. In a powered vehicle having an internal combustion engine including a carburetor, a carburetor hat for directing induction fluid into the carburetor, said carburetor hat comprising:

an outer wall defining a neck section, a throat section, and an internal chamber disposed between the neck and throat sections, said neck section defining an upstream-most inlet communicating with the internal chamber;

an inlet defining a central inlet axis, said throat section presenting an interior circumferential surface and defining a downstream-most outlet communicating with the internal chamber;

an outlet defining a central outlet axis, said inlet and outlet axes being non-coaxial, said internal chamber presenting an upper-most ceiling, an oppositely spaced floor, and a pair of sidewalls extending between the ceiling and floor; and an air-diffuser vane disposed within the internal chamber and extending between the ceiling and floor so that induction fluid flowing from the inlet must travel around the vane to reach the outlet, said air diffuser vane being disposed between the neck and throat sections and presenting at least one side extending generally transverse to the inlet axis and being positioned adjacent said interior circumferential surface.

15. In the powered vehicle as claimed in claim 14,
said central inlet and central outlet axes being generally perpendicular.

16. In the powered vehicle as claimed in claim 15,
said central inlet axis being a generally vertically extending axis,
said central outlet axis being a generally horizontally extending axis.

17. In the powered vehicle as claimed in claim 14,
said air-diffuser vane being spaced from each of the sidewalls to thereby define a pair of air passageways in the chamber wherein each passageway is spaced from the central outlet axis so that induction fluid flowing through the chamber is diverted into at least two separate streams before the induction fluid reaches the central outlet axis.

18. In the powered vehicle as claimed in claim 14, said air-diffuser vane being generally triangular in configuration and defining at least three sides with said at least one side comprising one of the three sides, the other two sides extending from the said at least one side towards the inlet and converging generally at the central inlet axis.

19. In the powered vehicle as claimed in claim 14; and an additional air-diffuser vane disposed within the chamber and spaced from the first-mentioned air-diffuser vane.

20. In the powered vehicle as claimed in claim 19, said additional air-diffuser vane being disposed between the first-mentioned vane and the end of the chamber distal-most relative to the inlet to thereby define an air passageway between the additional vane and the distal-most end of the chamber.

21. In the powered vehicle as claimed in claim 20, said additional air-diffuser vane presenting a side extending generally transverse to the central inlet axis and being positioned adjacent said interior circumferential surface, said side extending between the ceiling and floor so that induction fluid flowing through the passageway must travel around the additional vane to reach the outlet.

22. In the powered vehicle as claimed in claim 19, said first-mentioned air diffuser vane being generally triangular in configuration, said additional air diffuser vane being generally arcuate in configuration.

23. In the powered vehicle as claimed in claim 19; and a generally frustoconical projection extending downwardly from the ceiling of the internal chamber, said generally frustoconical projection being positioned between said first-mentioned air diffuser vane and said additional air diffuser vane.

24. In the powered vehicle as claimed in claim 23, said generally frustoconical projection defining an internal bore extending through the outer wall to thereby intercommunicate the chamber with the atmosphere.

25. In the powered vehicle as claimed in claim 14, said at least one side extending axially from the inside circumferential surface of said throat section.

26. In the powered vehicle as claimed in claim 14, said outer wall presenting a generally tear-dropped shape configuration.

* * * * *